No. 671,341. Patented Apr. 2, 1901.
J. INMAN.
ANT TRAP.
(Application filed Oct. 31, 1900.)
(No Model.)
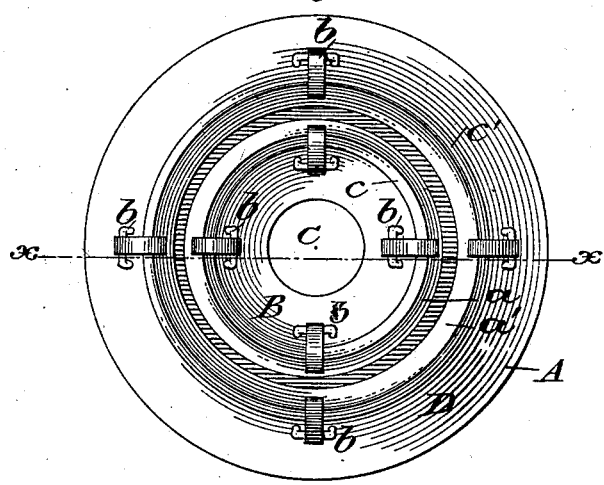
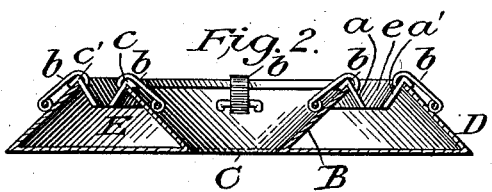
Witnesses:
B. L. Jones,
B. F. Steadman.
Inventor:
Joseph Inman.
Per Z. P. Dederick,
Atty.

UNITED STATES PATENT OFFICE.

JOSEPH INMAN, OF SHERMAN, TEXAS.

ANT-TRAP.

SPECIFICATION forming part of Letters Patent No. 671,341, dated April 2, 1901.

Application filed October 31, 1900. Serial No. 35,015. (No model.)

*To all whom it may concern:*

Be it known that I, JOSEPH INMAN, a citizen of the United States, residing at Sherman, in the county of Grayson and State of Texas, have invented certain new and useful Improvements in Ant-Traps; and I do hereby declare the following to be a full, clear, and exact description of the invention, such as will enable others skilled in the art to which it appertains to make and use the same.

My invention relates to that class of ant-traps in which two reversely-arranged sheet-metal conical walls are arranged to form a vessel which when placed around the entrance to their nest is adapted for entrapping and retaining all the ants that may approach it from within or without.

The object of my invention is to produce a simple device of this kind which will excel the former traps in depositing the ants within the annular pan and in efficiency for convenient discharge of the trapped insects.

The accompanying drawings illustrate my invention.

Figure 1 is a top view, and Fig. 2 a central vertical section through the line $x$ $x$.

My invention comprises the combination of a centrally-perforated base-plate A, an outwardly-sloping inner wall B, fastened to the upper face of the base-plate and extending upward therefrom, surrounding the hole C in the base-plate and provided at its upper rim with a downwardly-projecting annular flange $a$, and an inwardly-sloping outer wall D, fastened to the rim of the base-plate around the inner wall and provided with the downwardly-sloping annular flange $a'$, thus forming between the two walls and base-plate an annular chamber E, which is open at the top and virtually triangular in cross-section. The annular flanges $a$ $a'$ have a more abrupt angle or descent downward than the walls B and D and are crimped around their upper edges, slightly overlapping the upper edges of walls B D, where they are secured by suitable hooks $b$.

In practice the trap is set upon the ground with the margin of the hole C surrounding the ant-hole. The ants will come out of the ant-hole and pass up the sloping inner wall B until they come to the ledge $c$, over which they will pass, and immediately upon doing so they slide down the abrupt and smooth descent of same into the chamber E, from which it is impossible for them to escape. If the trap is placed at the ant-hole after any ants have left the same on a foraging expedition, such ants when returning will pass up the outside of wall D and over the ledge $c'$ and into the chamber E, thus becoming entrapped in said chamber. My trap thus serves at one setting to catch all the ants which leave or try to return to the nest while the trap is set.

It has been fully demonstrated that ants of any species will not deliberately walk over the abrupt upper walls or ledges of most traps heretofore constructed, but all will hesitate upon approaching them and many turn back, thus escaping being caught, while with my device the idea seems to prevail that as they have safely ascended the outward-sloping wall they can as securely descend the narrow inner ledges; but these being on a more acute angle and very smooth cause them to at once slide down these ledges and into chamber E, from whence escape is impossible.

When caught in the trap the ants may be destroyed by pouring hot water into the chamber E, when by lifting the hooks $b$ and removing the annular rings $a$ $a'$ they may be poured out through the opening $e$ between the tops of walls B and D.

It will be seen that the trap consists of a permanent integral body comprising two concentric rings reversely and gradually inclined and connected at the bottom by a base-plate, so as to form an annular ant-receiving chamber, and further provided with detachable rings or annular flanges having their upper edges bent to hook on the upper edges of the gradually-inclined parts aforesaid, the said flanges being held in place by hooks on the permanent body and inclined too steeply for ants to refrain from falling through the annular opening between the said flanges.

Having thus described my invention, what I claim as new, and desire to secure by Letters Patent, is—

In an ant-trap, a permanent body consisting of two concentric rings, the inner of which inclines outward and the outer inward, and a bottom for the annular ant-receiving chamber between them, in combination with two steeply-inclined annular converging flanges provided with bent parts fitting on the upper edges of the said rings and hooks which are pivoted on the said rings and catch over the said flanges to hold them in place, the said flanges leaving an annular opening between them and the said trap being provided with a central opening corresponding to the ant-hole substantially as set forth.

JOSEPH INMAN.

Witnesses:
B. L. JONES,
B. F. STEEDMAN.